United States Patent [19]

Keller

[11] 4,235,318

[45] Nov. 25, 1980

[54] BICYCLE WHEEL HUB WITH COASTER BRAKE

[75] Inventor: Josef Keller, Schweinfurt, Fed. Rep. of Germany

[73] Assignee: Fichtel & Sachs AG, Schweinfurt, Fed. Rep. of Germany

[21] Appl. No.: 898,141

[22] Filed: Apr. 20, 1978

[30] Foreign Application Priority Data

May 7, 1977 [DE] Fed. Rep. of Germany ... 7714501[U]

[51] Int. Cl.² ............................................. F16D 41/34
[52] U.S. Cl. ...................................... 192/6 R; 192/47; 192/78
[58] Field of Search ................... 192/6 R, 6 A, 37, 47, 192/77, 78; 188/26, 335

[56] References Cited

U.S. PATENT DOCUMENTS

| | | | |
|---|---|---|---|
| 606,217 | 6/1898 | Hoffman | 192/6 R |
| 635,414 | 10/1899 | Anderson | 192/6 R |
| 675,261 | 5/1901 | Barton | 192/6 R |
| 691,663 | 1/1902 | Quinn | 192/6 R |
| 747,576 | 12/1903 | Barton | 192/6 R |
| 2,224,907 | 12/1940 | Gee | 192/6 R |
| 2,376,042 | 5/1945 | English | 192/6 R |
| 3,190,415 | 6/1965 | Schwerdhofer et al. | 192/6 R |

Primary Examiner—Rodney H. Bonck
Attorney, Agent, or Firm—Toren, McGeady and Stanger

[57] ABSTRACT

The braking effect of the coaster brake in a bicycle wheel hub is improved by utilizing the frictional force of the wheel hub acting on an expanding split brake sleeve for further expanding the sleeve. A lug on the brake sleeve is received in a slot of a stationary bearing cone on the wheel axle in such a manner that the circumferential frictional force transmitted by the rotating hub shell to the brake sleeve causes the latter to tilt about a pivot axis spaced from the axis of hub rotation, and a cam face on the bearing element is inclined so that a component of the frictional circumferential force drives the lug along the cam face toward the internal face of the hub shell.

6 Claims, 6 Drawing Figures

BICYCLE WHEEL HUB WITH COASTER BRAKE

This invention relates to wheel hubs for bicycles and other vehicles, and particularly to a wheel hub equipped with an improved coaster brake.

Coaster brakes have been in common use on bicycles for many years. A split brake sleeve and a brake cone in the hub shell of a bicycle wheel are moved axially relative to each other by back-pedaling so that the cone enters the sleeve and expands the sleeve into frictional engagement with the internal face of the hub shell. Rotation of the brake sleeve with the shell is prevented by coupling engagement between the sleeve and an element fixed to the wheel axle and/or bicycle frame.

The brake action of the conventional coaster brake is adequate under most conditions. The brake action, however, is not always rapid enough in emergencies, and contaminants which reduce the coefficient of friction between the engaged brake sleeve and hub shell may further increase the distance traveled by a bicycle from the moment of brake application to ultimate standstill.

It is a primary object of this invention to increase the overall contact pressure between brake sleeve and hub shell in a coaster brake at a given back-pedaling force.

Another object is a localized increase in the contact pressure for disrupting a contaminant film not otherwise affected by braking.

With these and other objects in view, the invention provides an abutment on the supporting structure of the hub which prevents rotation of the brake sleeve with the still rotating hub shell and responds to the circumferential, frictional force exerted by the hub shell on the brake sleeve by exerting a radially outward force on the brake sleeve.

In the more specific aspects of this invention, a fulcrum portion on a lug of the brake sleeve engages a bearing face on the supporting structure for pivoting movement of the lug about a pivot axis spacedly parallel to the axis of rotation so that the circumferential, frictional force pivots the sleeve about the pivot axis to increase at least local contact pressure between sleeve and hub shell.

When the bearing face slopes from the axis of hub shell rotation obliquely in the direction of this rotation and radially outward, it constitutes a cam face which drives the lug and the entire brake sleeve radially outward during rotation of the hub shell, the fulcrum portion of the lug functioning as a cam follower.

Other features, additional objects, and many of the attendant advantages of this invention will readily be appreciated as the same becomes better understood from the followng detailed description of a preferred embodiment when considered in connection with the appended drawing in which.

Figure 1:
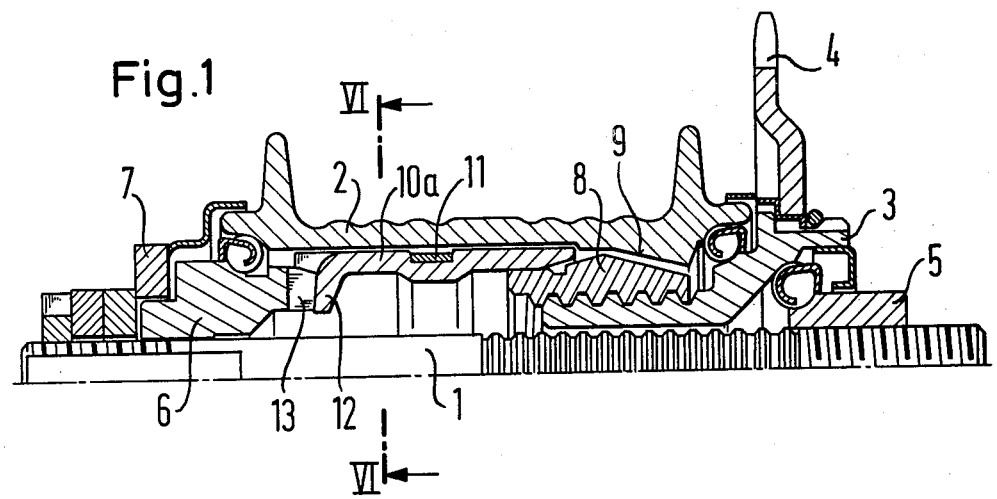
FIG. 1 shows one half of a bicycle hub equipped with a coaster brake of the invention in rear-elevational section, the half of the hub not shown in FIG. 1 being a mirror image of illustrated elements.

Referring now to the drawing in detail, and initially to FIG. 1, there is seen a rear-wheel hub for a bicycle which is supported on an axle 1, normally fixedly fastened in the non-illustrated bicycle frame. One axial end of a hub shell 2 is supported on a tubular driver 3 fixedly fastened to a sprocket 4 by means of a ball bearing, another ball bearing permitting rotation of the driver 3 on a bearng cone 5 threadedly adjustable, but normally fixed on the axle 1.

The other axial end of the hub shell 2 is supported on a ball bearing and a bearing cone 6 which is prevented from turning relative to the bicycle frame and the axle 1 by an arm 7 attached to the rear wheel fork in the bicycle frame in a manner too well known to require more detailed pictorial representation.

External threads on a tubular portion of the driver 3 in the cavity of the hub shell 2 are engaged by mating threads of a motion transmitting member 8 having the approximate external shape of a double cone. When the sprocket 4 turns the driver 3 during forward pedaling, friction and inertia cause the member 8 to move toward the right into driving engagement of one conical face thereof with a mating internal face 9 of the hub shell 2. During back pedaling, the member 8 moves axially toward the left for engagement with a split brake sleeve.

Figure 4:
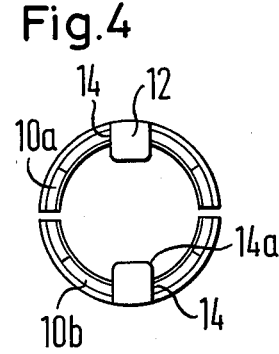
FIG. 4 illustrates a brake sleeve in the hub of FIG. 1 in side elevation on the scale of FIG. 2.
Figure 5:
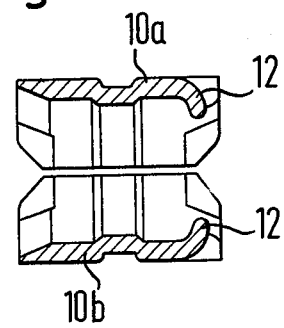
FIG. 5 shows the sleeve of FIG. 4 in front-elevational section.

The sleeve shown by way of example consists of two circumferential segments 10a, 10b which are held together by a spring clip 11. A circumferentially central portion of each segment 10a, 10b at the axial end of the sleeve remote from the member 8 is bent radially inward to constitute a lug 12, as is best seen in FIGS. 4 and 5.

The annular face of the bearing cone 6 directed toward the brake sleeve 10a, 10b has two diametrically opposite notches 13 which are open radially outward and axially toward the brake sleeve. The lugs 12 are received in the notches 13. When the member 8 moves axially toward the left, as viewed in FIG. 1, its conical face enters the bore of the sleeve 10a, 10b and expands the sleeve into frictional engagement of its outer face with an inner, practically cylindrical face portion of the hub shell 2. The sleeve beng prevented from turning with the hub shell 2 by the bearing cone 6, the hub shell 2 is braked.

The structure described so far is basically known and operates in a known manner.

Figure 2:
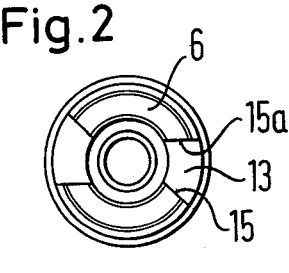
FIG. 2 shows a bearing element in the hub of FIG. 1 in side elevation and on a smaller scale.
Figure 3:
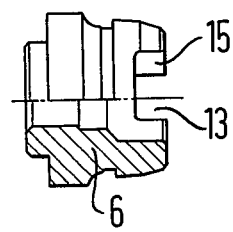
FIG. 3 is a plan view, partly in section, of the bearing element of FIG. 2.

The coaster brake of the invention differs from the known brakes by the shape of the notches 13 and of the cooperating lugs 12. As is seen also in FIG. 2, but best in FIG. 6, each notch or recess 13 is bounded circumferentially by two faces 15, 15a of the bearing cone 6 which is a fixed element of the supporting structure also including the axle 1 and defining the axis of rotation of the hub shell 2. The face 15 is obliquely inclined relative to every radius drawn on the axis of rotation of the hub shell 2, that is, the geometrical axis of the axle 1 and slopes radially outward in the circumferential direction of normal hub shell rotation indicated by a curved arrow in FIG. 6.

Figure 6:
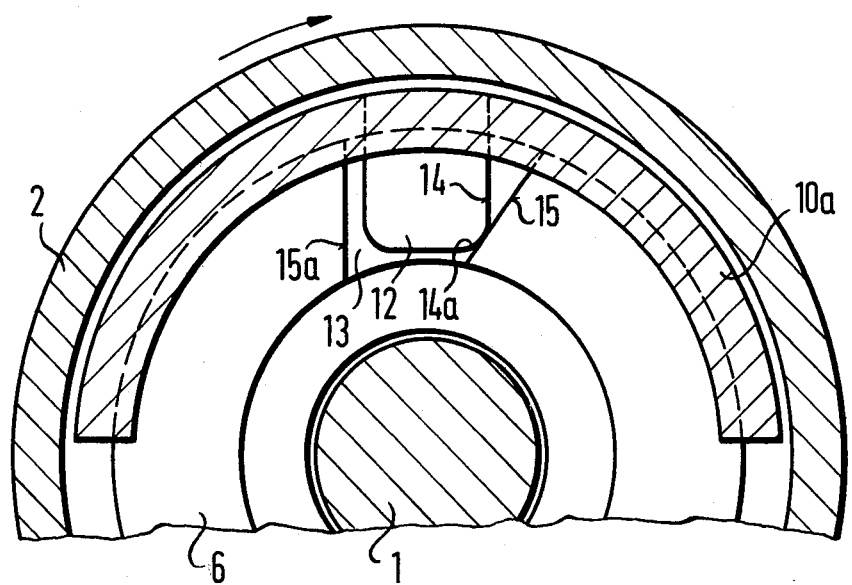
FIG. 6 shows the hub of FIG. 1 in enlarged, fragmentary section on the line VI—VI.

Each lug 12 has two, narrow, parallel edge faces 14 which extend radially inward from the main portion of each brake shell segment 10a, 10b. During incipient frictional engagement between the brake sleeve and the hub shell 2, the radially innermost portion 14a of one of the edge faces 14 engages the face 15 as is shown in FIG. 6. The frictional circumferential force exerted by the still rotating hub shell 2 on the brake sleeve tends to pivot the lug 12 about its edge portion 14a which is rounded so as to provide a fulcrum. The face 15 of the brake cone 6 being obliquely inclined relative to the frictionally engaged surfaces of the brake sleeve and the hub shell 2, a component of the frictional force is applied to the lug 12 to move the lug radially outward along the face 15 which thus functions as a cam face engaged by the edge portion 14a as a cam follower.

In the illustrated embodiment, the face 15 is inclined at an angle of about 20° relative to a plane including the axis of rotation and passing through the area of contact between the edge portion 14a and the face 15. The cam effect increases with the magnitude of this angle and is significant even when the angle is only 10°. If it is greater than 30°, the wheel may be blocked as soon as the pedals are turned backward.

The face 15a of the brake cone 6 does not contribute to the braking action and may be shaped to suit manufacturing convenience.

The camming cooperation of the edge portion 14a and the obliquely inclined face 15 of the brake cone 6 converts the circumferential force transmitted to the brake sleeve from the hub shell 2 into a radially outward force which generally increases the contact pressure between the brake sleeve and the cylindrical, internal face of the hub shell beyond that available from back pedaling alone.

The pivoting movement of the lug 12 and the integrally attached sleeve segment 10a, 10b which is actuated by the same circumferential, frictional force, tends to redistribute the contact pressure between brake sleeve and hub shell so as to produce a localized contact pressure greater than is available from the back-pedaling effort and the afore-mentioned camming cooperation. The area of maximum contact pressure sweeps the internal friction face of the hub shell 2 and tends to dislodge contaminants and to break contaminant films which may otherwise reduce friction between the brake sleeve and the hub shell.

The pivot effect is greatest if the pivot axis is as far from the internal face of the hub shell 2 as is possible. It is preferably not less than 20% of the radius of the internal hub shell face.

While it is preferred to modify the conventional coaster brake in such a manner as to benefit from both the pivot effect and the cam effect described above, each of the two effects alone improves the braking action. If there is area contact between the planar face 15 and a cooperating face of the lug 12, the pivot action would be lost, but the cam action would still be available. Conversely, a fulcrum on the bearing cone 6 cooperating with a planar, radial bearing face on the lug 12 would provide the pivot action described above without the cam action. Other modifications of this invention will readily suggest themselves on the basis of these teachings.

It should be understood, therefore, that the foregoing disclosure relates only to a preferred embodiment, and that it is intended to cover all changes and variations in the example of the invention herein chosen for the purpose of the disclosure which do not constitute departures from the spirit and scope of the invention set forth in the appended claims.

What is claimed is:

1. A hub for a wheel of a vehicle comprising:
   (a) a support defining an axis of rotation;
   (b) a hub shell mounted on said support for rotation about said axis in a predetermined direction, said hub shell having an internal face bounding a cavity in said hub shell;
   (c) brake means in said cavity including a circumferentially split sleeve member and a cone member;
   (d) brake actuating means including means for moving one of said split sleeve member and said cone member axially relative to the other member and for thereby expanding said sleeve member into frictional engagement with said internal face thereby to effect transmission of a circumferential force from said hub shell to said sleeve member during said rotation of the hub shell;
   (e) a lug rigidly connected to said sleeve member, said lug projecting fron said sleeve member toward said axis;
   (f) engagement means on said support brought into abutting engagement with said lug during rotation of said hub shell for preventing rotation of said sleeve member; and
   (g) force converting means operatively interposed between said sleeve member and said engagement means for deriving from said circumferential force a radially outward force which is exerted on said sleeve member, said force converting means comprising a fulcrum portion formed on said lug and a bearing face on said support, said fulcrum portion and said bearing face engaging each other to effect pivoting movement of said sleeve member on said support about a pivot axis generally parallel to said axis of rotation.

2. A hub as set forth in claim 1, wherein said internal face is of circularly arcuate cross section and centered in said axis of rotation, said pivot axis being offset from said internal face toward said axis of rotation by at least 20% of the radius of said internal face.

3. A hub as set forth in claim 1, wherein said bearing face on said support slopes from said axis obliquely in said predetermined direction and radially outward, said lug being formed with a cam follower portion engaging said bearing face during said rotation of the hub shell.

4. A hub as set forth in claim 1, wherein said engagement means on said support is formed to define a recess open in a radially outward direction, said support having said bearing face formed as a first face circumferentially bounding said recess in said predetermined direction, and also including a second face circumferentially bounding said recess in a direction opposite to said predetermined direction, said bearing face being obliquely inclined in said predetermined direction relative to every radius drawn on said axis and intersecting said bearing face, said lug engaging said bearing face durng said rotation of the hub shell.

5. A hub as set forth in claim 4, wherein said fulcrum portion on said lug comprises an edge face pivotally engaging said bearing face during said rotation of the hub shell.

6. A hub as set forth in claim 5 wherein said edge face is rounded.

* * * * *